3,394,132
4H-1,3-OXAZINE-4,6(5H)-DIONES AND THEIR PREPARATION

James C. Martin and Paul G. Gott, Kingsport, Tenn., assignors to Eastman Kodak Company, Rochester, N.Y., a corporation of New Jersey
No Drawing. Filed Mar. 31, 1966, Ser. No. 538,981
6 Claims. (Cl. 260—244)

ABSTRACT OF THE DISCLOSURE 4H-1,3-oxazine-5,6(5H)-diones, prepared by reacting an acyl isocyanate with a substituted ketene, are useful as intermediates in the preparation of N-acylmalonamates which in turn are useful as plasticizers.

---

This invention relates to certain oxazinediones as novel compositions of matter. It further relates to a method for combining acyl isocyanates with disubstituted ketenes to produce novel oxazinediones. Furthermore, it relates to a method for combining 4H-1,3-oxazine-4,6(5H)-diones with an alcohol to produce N-acylmalonamates.

A review of the literature reveals that the oxazinedione compounds and processes of this invention have not been reported. Although there is no mention in the literature of the 4H-1,3-oxazine-4,6(5H)-diones, sulfonyl azetidinediones have been reported. German Patent No. 1,098,515 describes the addition of sulfonyl isocyanates to ketenes to give the 4-membered ring products—the sulfonyl azetidinediones.

It is an object of this invention to provide certain oxazinediones as new compositions of matter.

Another object is to provide a method for preparing certain oxazinediones by reacting acyl isocyanates with substituted ketenes.

Yet another object is to provide a method for preparing N-acylmalonamates by combining certain novel oxazinediones with alcohol.

These and other objects are attained by the practice of this invention which, briefly, comprises combining a disubstituted ketene with an acyl isocyanate, usually in an inert solvent, and isolating the solid oxazinedione product. The resulting oxazinedione product may be combined with an alcohol to give N-acylmalonamates.

More specifically, the certain oxazinediones are obtained by reacting an acyl isocyanate having the formula

with a substituted ketene having the formula

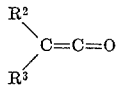

and providing 4H-1,3-oxazine-4,6(5H)-diones having the formula

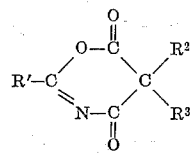

wherein R' is selected from the group consisting of aliphatic and cyclo aliphatic having from 1 to 16 carbon atoms and mono-nuclear aryl having from 6 to 10 carbon atoms; the substituents $R^2$ and $R^3$, when taken singly, are selected from the group consisting of alkyl having from 1 to 12 carbon atoms and mononuclear aryl having from 6 to 10 carbon atoms, and the substituents $R^2$ and $R^3$, when taken collectively with the carbon atom to which they are attached, represent joined alkylene groups completing a carbocyclic ring of 4 to 10 ring carbon atoms.

The acyl isocyanates that are suitable for use in the present invention are well-known compounds. A convenient synthesis for this class of compounds has been described by Speziale and Smith in J. Org. Chem., 27, 3742 (1962). Some acyl isocyanates that are suitable for use in the present invention are: chloroacetyl isocyanate, phenyl-acetyl isocyanate, diphenylacetyl isocyanate, benzoyl isocyanate, p-methoxybenzoyl isocyanate, p-chlorobenzoyl isocyanate, trichloromethylacetyl isocyanate, p-methylbenzoyl isocyanate, m-methylbenzoyl isocyanate, o-methylbenzoyl isocyanate, m-nitrobenzoyl isocyanate, aceyl isocyanate, propionyl isocyanate, isobutyryl isocyanate, dodecanoyl, isocyanate, stearoyl isocyanate, etc.

Aliphatic groups which may be used as the group R' in this invention are alkyl and alkyl groups substituted with halogens, phenyls, etc.

Ketenes and their use in chemical reactions are old. Ketenes that are suitable for use in this invention include the disubstituted ketenes, i.e., dialkyl, diaryl and alkylarylketenes. Typical ketenes which may be employed include the following: dimethylketene, diethylketene, methylpropylketene, butylethylketene, isobutylethylketene, dibutylketene, dihexylketene, dioctylketene, pentamethyleneketene, ethylmethylketene, diphenylketene, ditolylketene, ethylphenylketene, methylphenylketene, dibenzylketene, etc. Suitable ketenes are described by Hanford and Sauer in "Organic Reactions," vol. III, Roger Adams, editor, John Wiley and Sons, Inc., New York, 1946, pp. 108–140. Dialkylketenes, which are used in this invention, may also be prepared by pyrolyzing anhydrides of dialkylacetic acids to the corresponding dialkylketenes and dialkylacetic acids in accordance with the process disclosed in Hasek et al., U.S. Patent 3,201,474.

In the process for preparing 4H-1,3-oxazine-4,6(5H)-diones by reacting ketenes with acyl isocyanates, it is not necessary to use a solvent, but it is frequently advantageous to do so. Suitable solvents include esters, ethers, aliphatic and aromatic hydrocarbons and chlorinated hydrocarbons, nitriles, etc., and also certain dipolar solvents such as nitromethane, nitrobenzene, dimethylformamide, dimethylacetamide, tetramethylene sulfone, propylene carbonate, dimethylsulfoxide, etc.

The temperature of the subject reaction is generally governed by the nature of the reactants. However, temperatures ranging from 0 to 180° C. may be used.

An equimolar ratio of acyl isocyanate to ketene is generally used although an excess of either reactant is not detrimental to the reaction.

The 4H-1,3-oxazine-4,6(5H)-diones produced by this invention are useful as intermediates in the preparation of plasticizers. The esters, N-acylmalonamates, obtained from the reaction of alcohols with 4H-1,3-oxazine-4,6(5H)-diones are useful as plasticizers for various reisns, e.g., cellulose acetate butyrate. Example 8 exemplifies the use of the N-acylmalonamates as plasticizers.

The following examples illustrate the best modes contemplated for carrying out this invention.

Example 1

To a stirred solution of benzoyl isocyanate (15 g.; 0.11 mole) in benzene (150 ml.) was added dimethylketene (11.9 g.; 0.17 mole). The reaction was exothermic and the temperature was kept at 25–40° C. by means of a cooling bath. The solvent was removed in vacuo and the solid residue was recrystallized from benzene to give 5.5 g. of 5,5-dimethyl-2-phenyl-4H-1,3-oxazine-4,6(5H)-dione, M.P. 133–135° C.

*Analysis.*—Calcd. for $C_{12}H_{11}NO_3$: C, 66.4; H, 5.1; N, 6.5. Found: C, 65.9; H, 5.2; N, 6.3.

The structure of the product in Example 1 was proven by hydrogenation to N-benzyl-2,2-dimethylmalonamic acid.

The following equation illustrates the reaction that took place.

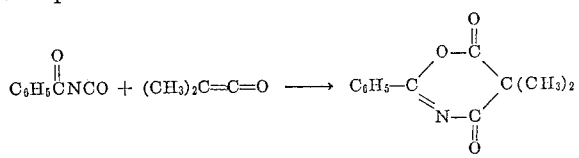

Example 2

To a stirred solution of trichloroacetyl isocyanate (5.7 g.; 0.03 mole) in benzene (30 ml.) was added dimethylketene (2.1 g.; 0.03 mole). The exothermic reaction was kept at 25–40° C. by a cooling bath. The solid that formed was removed by filtration and dried to give 6.0 g. of 5,5-dimethyl-2-trichloromethyl-4H-1,3-oxazine-4,6(5H)-dione. Recrystallization from a mixture of benzene and hexane gave a product melting at 152–155° C.

*Analysis.*—Calcd. for $C_7H_6Cl_3NO_3$: C, 32.5; H, 2.3; N, 5.4. Found: C, 32.8; H, 2.4; N, 5.2.

The reaction that occurred is illustrated by the following equation:

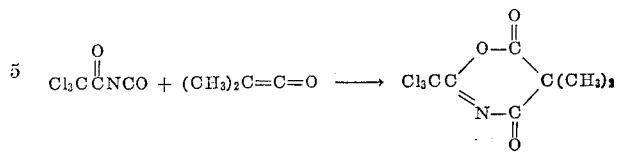

Example 3

A mixture of benzoyl isocyanate (4 g.; 0.027 mole), diphenylketene (5 g.; 0.026 mole) and benzene (5 ml.) was refluxed for 5 hours. The crystals that formed on cooling were removed by filtration and dried to give 4.2 g. of 2,5,5-triphenyl-4H-1,3-oxazine-4,6(5H)-dione, M.P. 161.5–163.5° C. (decomp.).

The following equation represents the reaction that took place.

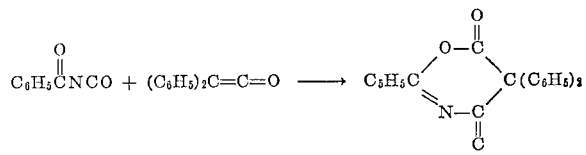

Example 4

Under the general conditions of Example 2, the isocyanates and ketenes listed in the following table give the indicated products.

| Isocyanate | Ketene | Product |
|---|---|---|
| $NO_2$—⟨⟩—$\overset{O}{\overset{\|}{C}}NCO$ | $(C_4H_9)_2C{=}C{=}O$ | $NO_2$—⟨⟩—structure with $C(C_4H_9)_2$ |
| $ClCH_2\overset{O}{\overset{\|}{C}}NCO$ | $(C_8H_{17})_2C{=}C{=}O$ | $ClCH_2C$ structure with $C(C_8H_{17})_2$ |
| $C_{11}H_{23}\overset{O}{\overset{\|}{C}}NCO$ | $\begin{array}{c}C_6H_5\\ \phantom{C}\diagdown\\ \phantom{CH_3}C{=}C{=}O\\ \diagup\\ CH_3\end{array}$ | $C_{11}H_{23}C$ structure with $C_6H_5$, $CH_3$ |
| $(C_6H_5)_2CH\overset{O}{\overset{\|}{C}}NCO$ | $(CH_3)_2C{=}C{=}O$ | $(C_6H_5)_2CHC$ structure with $C(CH_3)_2$ |
| $Cl$—⟨⟩—$\overset{O}{\overset{\|}{C}}NCO$ | $(C_6H_5CH_2)_2C{=}C{=}O$ | $Cl$—⟨⟩—structure with $C(CH_2C_6H_5)_2$ |
| $CH_3$—⟨⟩—$\overset{O}{\overset{\|}{C}}NCO$ | ⟨⟩$=C=O$ | $CH_3$—⟨⟩—structure with cyclohexyl |

The foregoing oxazinediones also may be reacted with an alcohol having the formula:

$$R^4OH$$

to provide N-acylmalonamate having the formula:

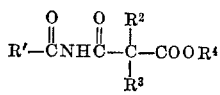

wherein R', R² and R³ respectively are as previously described and R⁴ is selected from the group consisting of alkyl or substituted alkyl having from 1 to 16 carbon atoms, and mononuclear aryl having 6 to 10 carbon atoms.

In addition the oxazinediones may also be hydrogenated to provide N-acylmalonamic acid having the formula

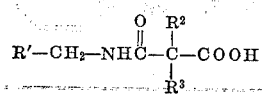

wherein R', R² and R³ respectively are as previously described.

Suitable alcohols which may be used include methyl alcohol, ethyl alcohol, propyl alcohol, isopropyl alcohol, butyl alcohol, isobutyl alcohol, octyl alcohol, isooctyl alcohol, decyl alcohol, lauryl alcohol, benzyl alcohol, etc. Phenols and substituted phenols are also suitable.

The reaction may be carried out in a solvent. Suitable solvents include ethers, esters, aliphatic and aromatic hydrocarbons and chlorinated hydrocarbons. However an excess of alcohol may be used as the solvent.

The process for the reaction of the oxazinedione with alcohol may be operated without a catalyst. However, it is preferred to use a catalyst and maintain the temperature within the range from 0° to 200° C. Catalytic agents that may be used are basic materials and include sodium carbonate, sodium hydroxide, sodium alkoxides, triethylenediamine, benzyltrimethylammonium hydroxide, etc.

The following examples describe some typical reactions in which the above oxazinediones are converted to N-acylmalonamates and N-acylmalonamic acid. The ester may be obtained by combining the oxazinedione with an alcohol. The acid may be obtained by hydrogenating the oxazinedione.

Example 5

A solution of 5,5-dimethyl-2-phenyl-4H-1,3-oxazine-4,6 (5H)-dione (5 g. 0.023 mole) in toluene (200 ml.) was hydrogenated in a magnetically stirred pressure bottle at 40 p.s.i. and 25° C. over 5% palladium (2 g.) on carbon. The catalyst was removed by filtration and washed with 75 ml. of acetone. All filtrates and extracts were combined and evaporated in vacuo to give 3.1 g. (60%) of crude N-benzyl-2,2-dimethylmalonamic acid. Recrystallization from toluene gave material melting at 112–114° C. Infrared absorptions (KBr), 3.00, 3.6 to 4.4, 5.83 to 6.23 and 6.50μ; n.m.r. spectrum (C₂H₂Cl₄), singlet at 1.49, 6H(methyl groups), doublet of 4.46, 2H(methylene group), broad peak at 7.00, 1H(—NH), singlet at 7.29, 5H(aromatic protons), and a singlet at 11.23, 1H p.p.m. (—COOH).

Analysis.—Calcd. for C₁₂H₁₅NO₃: C, 65.1; H, 6.8; N, 6.3. Found: C, 65.4; H, 6.9; M, 7.0.

The reaction that took place is illustrated by the following equation:

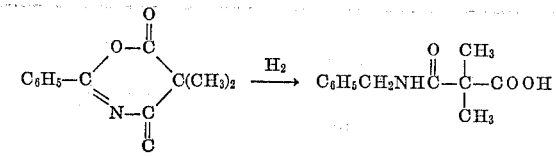

Example 6

A mixture of 5,5-dimethyl-2-phenyl-4H-1,3-oxazine-4,6 (5H)-dione (2.17 g.; 0.01 mole), sodium methoxide (0.1 g.) and methanol (15 ml.) heated up spontaneously and the solid went into solution. After standing for 12 hrs. at room temperature, the solvent was removed in vacuo. The viscous residue was treated with 6 ml. of water to effect crystallization. Filtration gave 1.2 g. (48%) of methyl N-benzoyl-2,2-dimethylmalonamate. A sample after recrystallization from carbon tetrachloride melted at 69–71° C. Infrared absorptions (KBr), 3.0, 5.75, 5.90 and 6.0μ, n.m.r spectrum (CHCl₃), singlet at 1.56, 6H(gem-dimethyl group), singlet at 3.81, 3H(methoxy group), multiplets at 7.53, 3H and 7.95, 2H (aromatic protons), and broad singlet at 10.15, 1H p.p.m. (—NH).

Analysis.—Calcd. for C₁₃H₁₅NO₄: C, 62.6; H, 6.1; N, 5.6. Found: C, 62.8; H, 6.2; N, 5.3.

The reaction that took place is illustrated by the following equation:

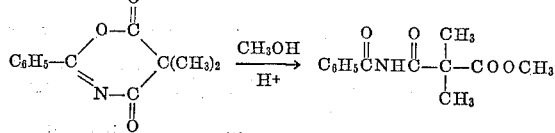

Example 7

Using the general procedure described in Example 6, 5,5-dimethyl-2-phenyl-4H-1,3-oxazine-4,6-(5H)-dione and n-decyl alcohol give decyl N-benzoyl-2,2-dimethylmalonamate.

The following equation represents the reaction that took place.

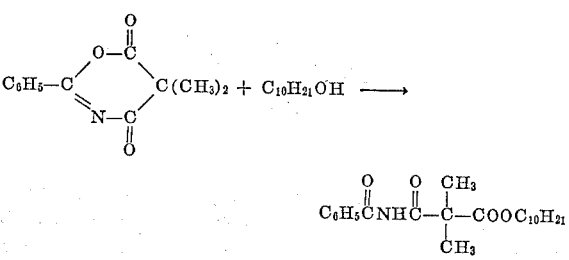

Example 8

Twenty parts of the ester described in Example 7 and 80 parts of cellulose acetate butyrate are milled together on heated rolls. The resulting resin is quite tough, has good appearance and is easy to mold.

Example 9

Under the general conditions described in Example 6, the following 4H-1,3-oxazine-4,6(5H)diones and alcohols react to give the indicated products.

| Oxazinedione | Alcohol | Product |
|---|---|---|
| 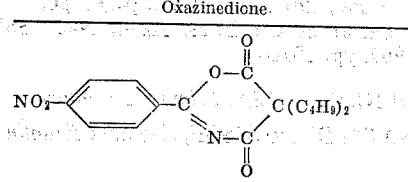 | 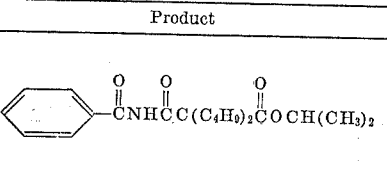 | |

| Oxazinedione | Alcohol | Product |
|---|---|---|
| $C_{11}H_{23}-C\begin{smallmatrix}O-C(=O)\\ \\ N-C(=O)\end{smallmatrix}C(C_6H_5)(CH_3)$ | $C_4H_9OH$ | $C_{11}H_{23}\overset{O}{\overset{\|}{C}}NH\overset{OCH_3}{\overset{\|}{C}}\overset{}{\underset{C_6H_5}{C}}-\overset{O}{\overset{\|}{C}}OC_4H_9$ |
| $(C_6H_5)_2CHC\begin{smallmatrix}O-C(=O)\\ \\ N-C(=O)\end{smallmatrix}C(CH_3)_2$ | $C_{16}H_{33}OH$ | $(C_6H_5)_2CH-\overset{O}{\overset{\|}{C}}NH\overset{O}{\overset{\|}{C}}C(CH_3)_2\overset{O}{\overset{\|}{C}}O\cdot C_{16}H_{33}$ |
| $Cl-\langle\bigcirc\rangle-C\begin{smallmatrix}O-C(=O)\\ \\ N-C(=O)\end{smallmatrix}C(CH_2C_6H_5)_2$ | $\langle\bigcirc\rangle-OH$ | $Cl-\langle\bigcirc\rangle-\overset{O}{\overset{\|}{C}}NH\overset{O}{\overset{\|}{C}}-C(CH_2C_6H_5)_2\overset{O}{\overset{\|}{C}}O-\langle\bigcirc\rangle$ |

Example 10

Under the general conditions of Examples 6, 5,5-dimethyl-2-phenyl-4H-1,3-oxazine-4,6(5H)-dione (2.17 g.; 0.01 mole), triethylenediamine (0.05 g.) and methanol (10 ml.) give methyl N-benzoyl-2,2-dimethylmalonamate.

Example 11

An equimolar mixture of 5,5-dimethyl-2-phenyl-4H-1,3-oxazine-4,6(5H)-dione and n-decyl alcohol is heated for 2 hrs. in an autoclave at 150° C. to give decyl N-benzoyl-2,2-dimethylmalonamate.

Although the invention has been described in considerable detail with particular reference to certain preferred embodiments thereof, variations and modifications can be effected within the spirit and scope of the invention as described hereinbefore, and as defined in the appended claims.

We claim:

1. A novel oxazinedione having the formula

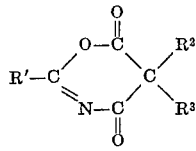

wherein R' is alkyl or chloroalkyl of 1 to 16 carbon atoms, benzyl, phenyl, chlorophenyl, nitrophenyl, or tolyl; the substituents $R^2$ and $R^3$, when taken singly, are alkyl of 1 to 12 carbon atoms, benzyl, or phenyl and the sub-substituents $R^2$ and $R^3$, when taken collectively with the carbon atom to which they are attached, represent joined alkylene groups completing a carbocyclic ring of 4 to 10 ring carbon atoms.

2. A compound as defined in claim 1 having the formula:

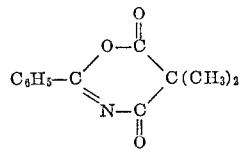

3. A compound as defined in claim 1 having the formula:

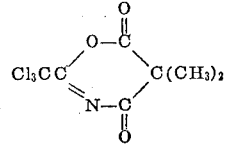

4. A compound as defined in claim 1 having the formula:

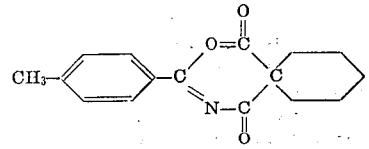

5. A process which comprises mixing an acyl isocyanate of the formula:

with a substituted ketene of the formula:

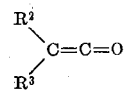

wherein R' is alkyl or chloroalkyl of 1 to 16 carbon atoms, benzyl, phenyl, chlorophenyl, nitrophenyl, or tolyl; the substituents $R^2$ and $R^3$, when taken singly, are alkyl of 1 to 12 carbon atoms, benzyl, or phenyl and the substituents $R^2$ and $R^3$, when taken collectively with the carbon atom to which they are attached, represent joined alkylene groups completing a carbocyclic ring of 4 to 10 ring carbon atoms.

6. A process according to claim 5 in which the temperature is in the range of 0 to 180° C.

References Cited

UNITED STATES PATENTS 2,600,596   6/1952   Winberg _____ 260—244
2,797,217   6/1957   Safir et al. _____ 260—244

OTHER REFERENCES

Graf et al.: German application 1,098,515 (12 p. 5) February 1961, 260—239, 2 pages spec.

Gunar et al.: Izves. Akad. Nauk SSSR Ser. Khim. 1965, pp. 1076–7.

HENRY R. JILES, *Primary Examiner.*

NATALIE TROUSOF, *Assistant Examiner.*